(12) United States Patent
Wu et al.

(10) Patent No.: US 8,360,382 B2
(45) Date of Patent: Jan. 29, 2013

(54) STAND ASSEMBLY AND ELECTRONIC DEVICE

(75) Inventors: Wei-Ming Wu, Taipei (TW); Ker-How Lu, Taipei (TW)

(73) Assignee: Pegatron Corporation, Taipei (TW)

( * ) Notice: Subject to any disclaimer, the term of this patent is extended or adjusted under 35 U.S.C. 154(b) by 551 days.

(21) Appl. No.: 12/552,917

(22) Filed: Sep. 2, 2009

(65) Prior Publication Data
US 2010/0051775 A1 Mar. 4, 2010

(30) Foreign Application Priority Data

Sep. 3, 2008 (TW) .............................. 97133766 A

(51) Int. Cl.
*A47G 29/00* (2006.01)

(52) U.S. Cl. ........ 248/371; 248/688; 248/460; 248/165; 248/444; 248/454; 379/454

(58) Field of Classification Search .................. 248/371, 248/688, 163.1, 166, 434, 168, 170, 176.3, 248/188.1, 188.8, 309.1, 274.1, 460, 463, 248/454, 455, 457, 458, 464, 465, 165, 444, 248/276.1, 346.3, 923; 379/454, 455, 446; 361/679.21, 679.23; 455/347; 16/349, 366
See application file for complete search history.

(56) References Cited

U.S. PATENT DOCUMENTS

| 4,568,801 | A | * | 2/1986 | Gates et al. | 379/454 |
|---|---|---|---|---|---|
| 5,121,427 | A | | 6/1992 | Gumb et al. | |
| 6,971,622 | B2 | * | 12/2005 | Ziegler et al. | 248/454 |
| 7,415,108 | B2 | * | 8/2008 | Toh | 379/445 |
| 7,762,519 | B2 | * | 7/2010 | Kunii et al. | 248/688 |
| 8,011,636 | B2 | * | 9/2011 | Fukuda et al. | 248/685 |
| 2006/0145046 | A1 | | 7/2006 | Liou et al. | |

FOREIGN PATENT DOCUMENTS

| TW | M312886 U | 5/2007 |
|---|---|---|
| TW | 322712 Y | 11/2007 |

* cited by examiner

*Primary Examiner* — Todd M Epps
(74) *Attorney, Agent, or Firm* — Morris, Manning & Martin, LLP; Tim Tingkang Xia, Esq.

(57) ABSTRACT

The present invention provides a stand assembly for supporting an electronic device. The stand assembly includes a main stand member and an auxiliary stand member. The main stand member includes a first stand and a second stand. The first stand is pivotally connected to the electronic device. The second stand is pivotally connected to the first stand and capable of sliding relative to the electronic device. The auxiliary stand member is pivotally connected to the electronic device.

14 Claims, 8 Drawing Sheets

STAND ASSEMBLY AND ELECTRONIC DEVICE

BACKGROUND OF THE INVENTION

1. Field of the Invention

The invention relates to a stand assembly and an electronic device, and particularly, the invention relates to the stand assembly which could be unfolded to support the electronic device in various angles according to the user's requirements and the electronic device thereof.

2. Description of the Prior Art

The traditional table phone was only provided with transmitter and a plurality of key switches. Following the development of technology, the number of the additive functions of the table phone grows up for different requirements. A display could be configured on the table phone to show the phone number, the present time, or other information. However, the user is frequently hard to observe the information on the display because of the influence of the visual angle or the light reflection when the phone is placed on the tabletop, and the user must move to a suitable position or tilt the phone to a certain angle, which makes inconvenience to the user.

For example, the communicating device in the market is focus on the tiny appearance. However, the user often misses the tiny communicating device when it is placed on the tabletop.

Please refer to FIG. 1. FIG. 1 is a diagram illustrating the appearance of a traditional communicating device 1. As shown in FIG. 1, the communicating device 1 includes a front casing 10 and a back casing 12 configured on the front side and back side of the communicating device 1 respectively. The front casing 10 has a display 14 and a keyboard 16. When the communicating device lies on the tabletop, the range of visual angle of the display 14 is about 135 degrees and the display 14 has a glisten effect, so that the user could not observe the number, time, or other information on the display 14 clearly when the line of the sight of the user is located at the position out of the range of visual angle of the display 14. The user most adjusts the angle of the communicating device by hand to make the display clear.

In consideration of the inconvenience that the communicating device is unobvious on the tabletop, the manufacturers take the mobile phone holder to solve the problem above-mentioned and to attract the consumer. However, although the general mobile phone holder has function for holding the communicating device, it is hard to be carried with the mobile communicating device, and it takes an extra cost to the user.

Besides, a positioning stand for the popular photo communicating device as that for the digital camera is also an attraction for the consumer. Therefore, the manufacturer started to manufacture the mini-stand for supporting and positioning the photo communicating device. However, the mini-stands need to be carried alone and some kinds of them are larger than the communicating devices, so the mini-stands are not popular in the market.

For solving the above-mentioned problem, many phones with the stands have appeared continuously, but most of the stands only support the phone in one fixed angle that fails to satisfy all the requirements of the user. The other phones with the adjustable stands structure have complex construction to make difficult assemblies and high costs, and it causes a burden to the user and the manufacturer.

SUMMARY OF THE INVENTION

A scope of the invention is to provide a stand assembly for supporting an electronic device. The stand assembly includes a main stand member and an auxiliary stand member. The main stand member includes a first stand and a second stand. The first stand has a first axle and a second axle. The first axle of the first stand is pivotally connected to the electronic device. One terminal of the second stand is pivotally connected to the second axle of the first stand and another terminal of the second stand is connected to various positions of the electronic device selectively. The first stand is fixed with a first angle which the first axle rotates around the electronic device by positioning the second stand on the electronic device. The auxiliary stand member is pivotally connected to the first axle for making the auxiliary stand member to rotate around the electronic device for a second angle.

Another scope of the invention is to provide an electronic device comprising a casing, a main stand member and an auxiliary stand member. The main stand member includes a first stand and a second stand. The first stand has a first axle and a second axle. The first axle of the first stand is pivotally connected to the casing. One terminal of the second stand is pivotally connected to the second axle of the first stand and another terminal of the second stand is connected to various positions of the casing selectively. The first stand is fixed with a first angle which the first axle rotates around the casing by positioning the second stand on the casing. The auxiliary stand member is pivotally connected to the first axle for making the auxiliary stand member to rotate around the electronic device for a second angle.

Therefore, the stand assembly and the electronic device of the invention could be unfolded to support the electronic device in various angles according to the user's requirements. The stand assembly and the electronic device of the invention get rid of the traditional stand such as the fixed stand or the combining stand. In addition, the stand assembly and the electronic device of the invention provide merits such as easy use and high elasticity for the user.

The advantage and spirit of the invention may be understood by the following recitations together with the appended drawings.

BRIEF DESCRIPTION OF THE APPENDED DRAWINGS

DETAILED DESCRIPTION OF THE INVENTION

The scope of the invention is to provide a stand assembly and an electronic device. The stand assembly could be unfolded to support the electronic device in various angles according to the user's requirements, and it gets rid of the traditional stand such as the fixed stand or the combining stand. The advantage and spirit of the invention will be described in detail in the following embodiments.

Figure 1:
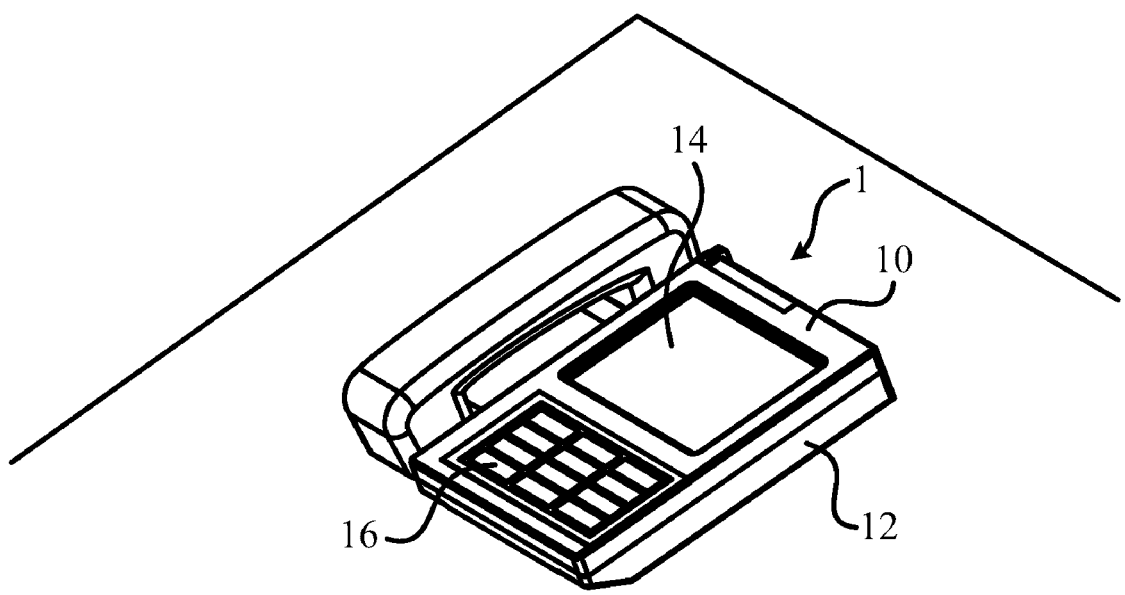
FIG. 1 is a diagram illustrating the appearance of a traditional communicating device.
Figure 2A:
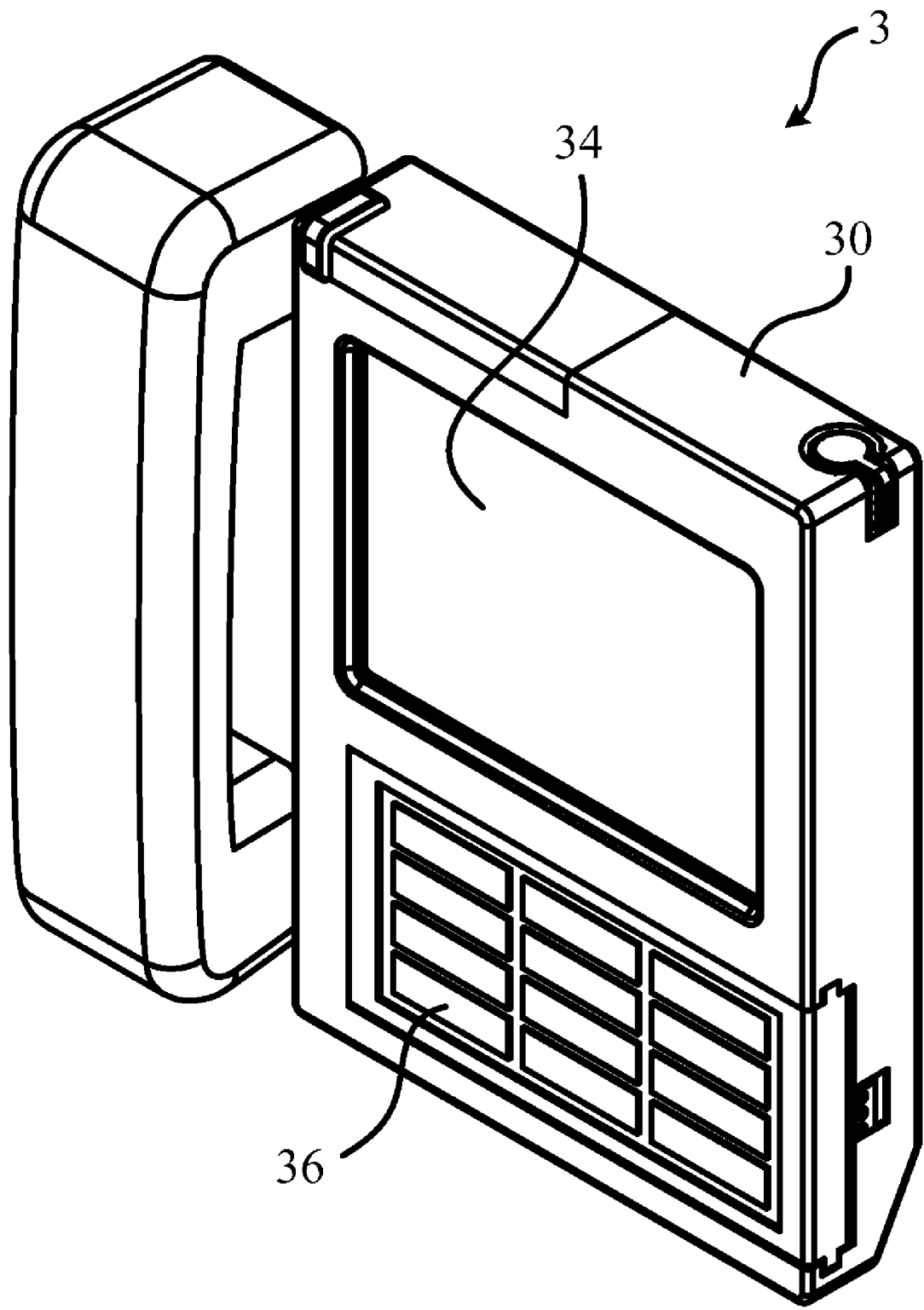
FIG. 2A is a pictorial front view illustrating an electronic device according to an embodiment of the invention.
Figure 2B:
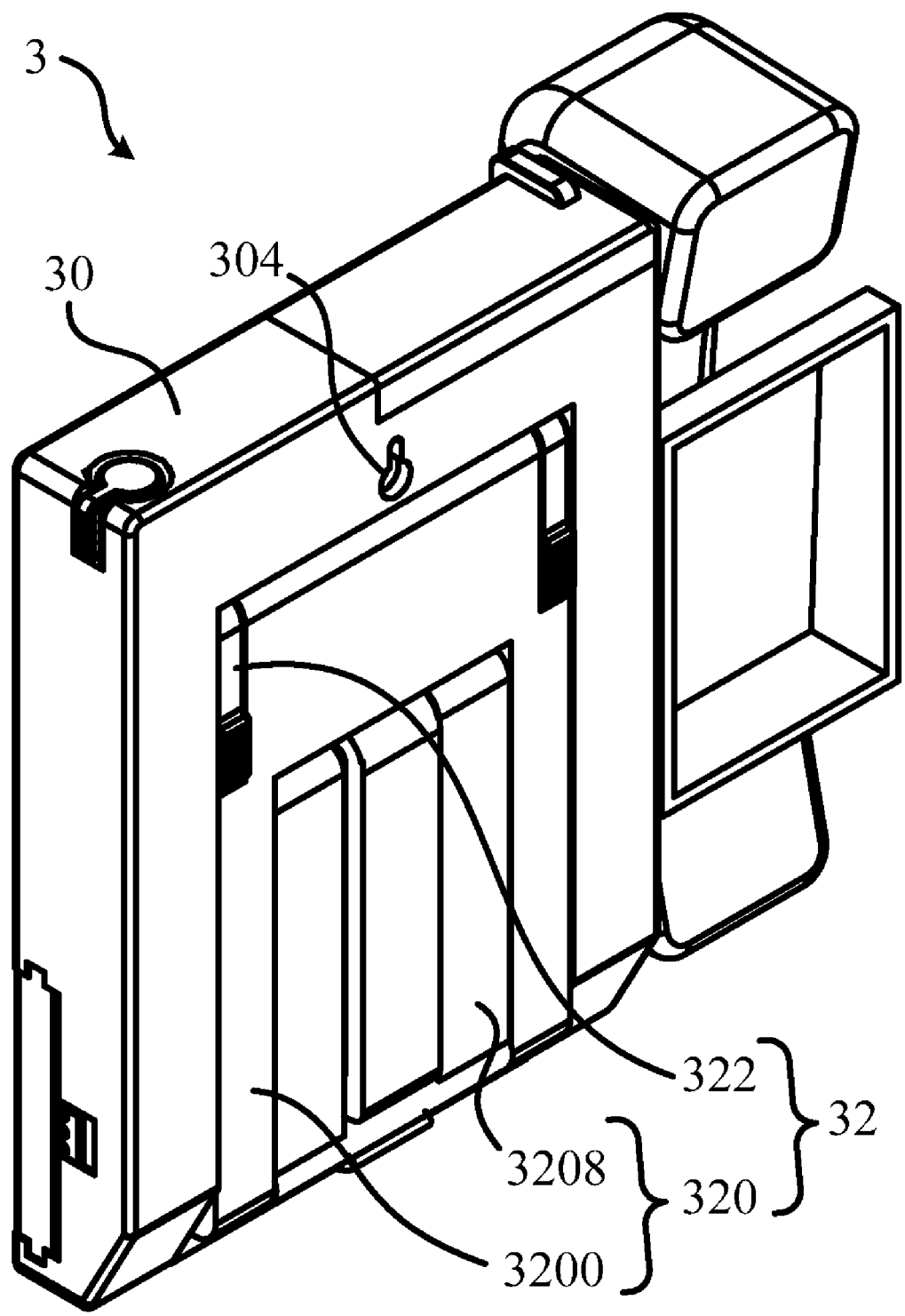
FIG. 2B is a pictorial back view illustrating the electronic device in FIG. 2A.

Please refer to FIG. 2A and FIG. 2B. FIG. 2A is a pictorial front view illustrating an electronic device 3 according to an embodiment of the invention. FIG. 2B is a pictorial back view illustrating the electronic device 3 in FIG. 2A. As shown in FIG. 2A and FIG. 2B, the electronic device 3 of the invention includes a casing 30, a stand assembly 32, a display 34, and a keyboard 36. The display 34 and the keyboard 36 are configured on the casing 30 of the electronic device 3. The angles between the main body of the electronic device 3 and the vertical surface such the wall or the horizontal surface such as the tabletop could be adjusted according to the support of the stand assembly 32 of the invention. The structures, functions, and motions of the stand assembly 32 and the electronic device 3 of the embodiment will be described in detail in the following.

Figure 3:
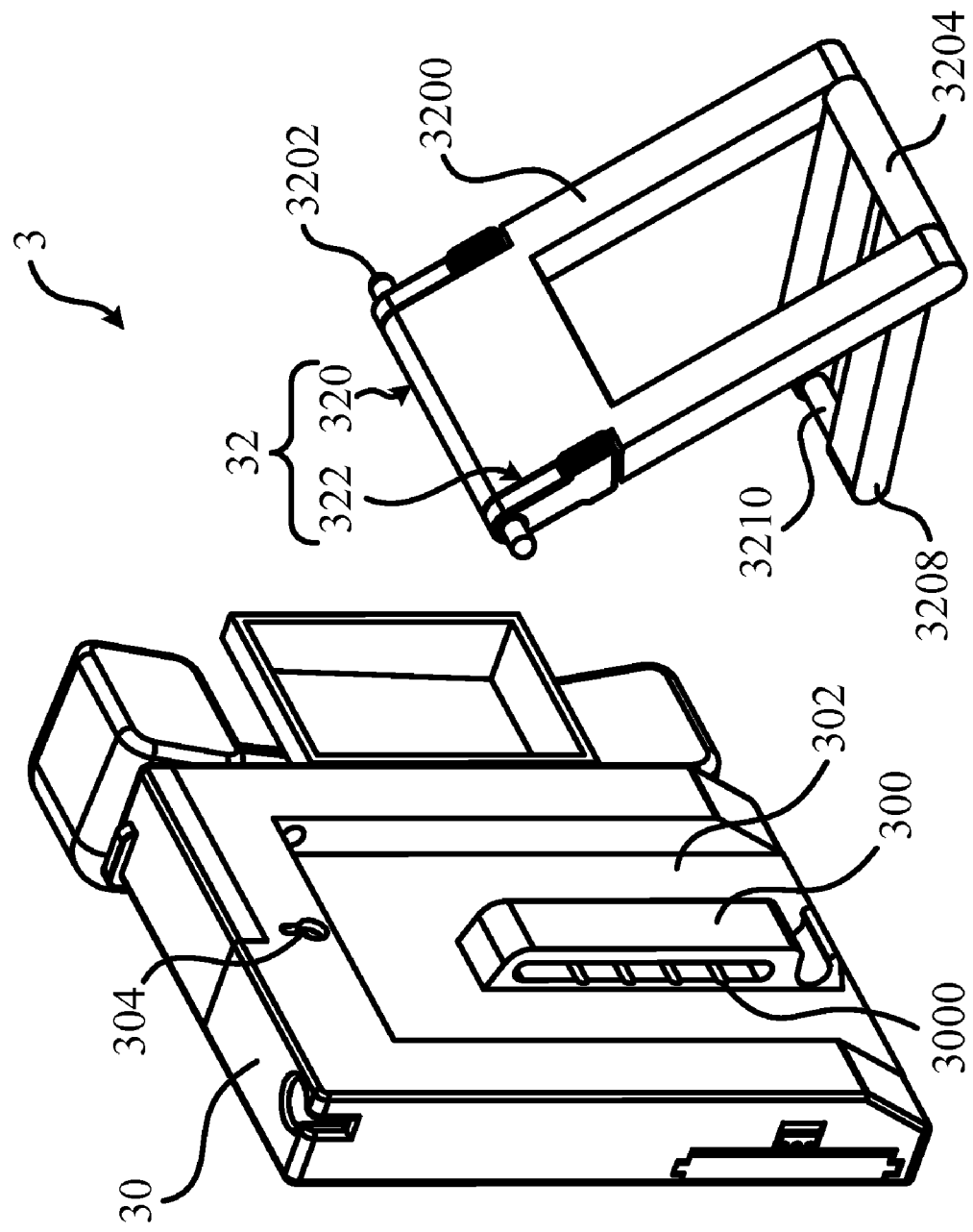
FIG. 3 is a pictorial decomposition view illustrating the electronic device and the stand assembly in FIG. 2B.

Please refer to FIG. 3. FIG. 3 is a pictorial decomposition view illustrating the electronic device 3 and the stand assembly 32 in FIG. 2B. As shown in FIG. 3, the above-mentioned stand assembly 32 includes a main stand member 320 and an auxiliary stand member 322, wherein the main stand member 320 further includes a first stand 3200 and a second stand 3208. The first stand 3200 of the main stand member 320 has a first axle 3202 and the second axle 3204. The first axle 3202 of the first stand 3200 could be pivotally connected to the casing 30 of the electronic device 3. One terminal of the second stand 3208 of the main stand member 320 is pivotally connected to the second axle 3204 of the first stand 3200. Another terminal of the second stand 3208 could be connected to various positions of the casing 30 of the electronic device 3 selectively. Besides, the auxiliary stand member 322 could be pivotally connected to the first axle 3202 of the first stand 3200 and pivotally connected to the casing 30 of the electronic device 3 via the first axle 3202, and it can rotate around the casing 30.

As show in FIG. 3, the casing 30 of the electronic device 3 further includes a limiting part 300 according to the embodiment of the invention, and the second stand 3208 of the main stand member 320 includes a wedging part 3210. The second stand 3208 can slide relatively to the casing 30 via the wedging part 3210 cooperating with the limiting part 300. In this embodiment, the limiting part 300 could be a groove as shown in FIG. 3, and the wedging part 3210 of the second stand 3208 could be wedged in the groove of the casing 30 to slide relatively to the casing 30 by the limitation of the groove. However, the limiting part 300 of the casing 30 is not limited to the groove. For example, the limiting part 300 configured on the casing 30 could be a slide rail or other machine for sliding.

As shown in FIG. 3, the casing 30 of the electronic device 3 could further include a configuring groove 302 according to the embodiment of the invention. The configuring groove 302 of the casing 30 could be used for containing the stand assembly 32. Namely, the configuring groove 302 of the casing 30 can contain the main stand member 320 and the auxiliary 322 completely to make the casing 30 of the electronic device 3 to be an integral in appearance. In other words, the stand assembly 32 could be hidden in the casing 30 of the electronic device 3 to make the appearance of the electronic device 3 simple and pithy.

Figure 4C:
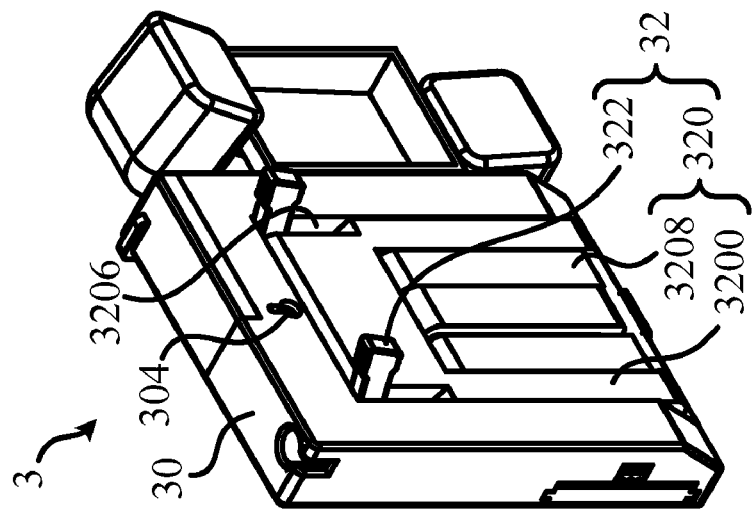
FIG. 4C is a schematic diagram illustrating the third operating state of the electronic device 3 and the stand assembly in FIG. 2B.
Figure 4B:
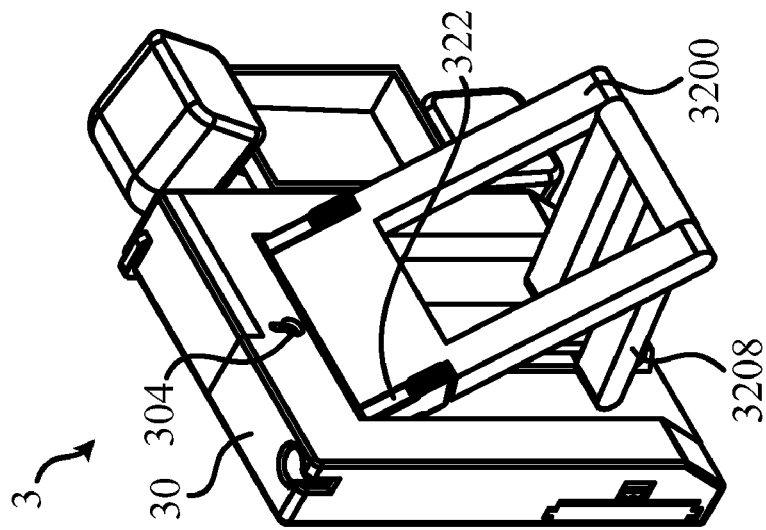
FIG. 4B is a schematic diagram illustrating the second operating state of the electronic device and the stand assembly in FIG. 2B.
Figure 4A:
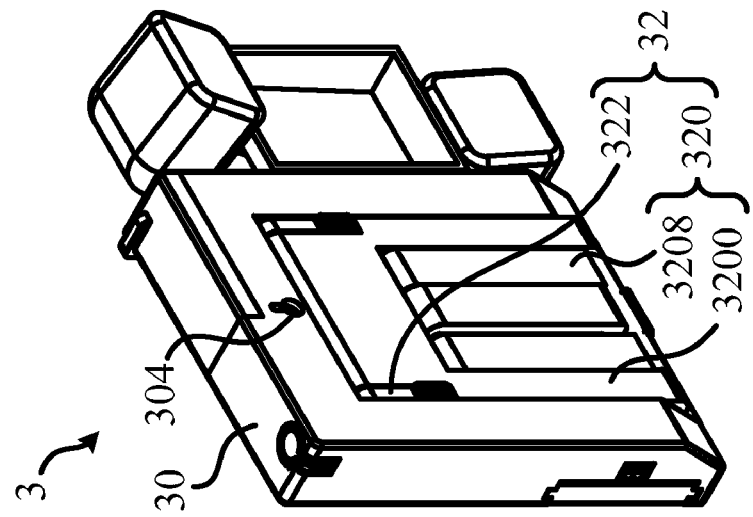
FIG. 4A is a schematic diagram illustrating the first operating state of the electronic device and the stand assembly in FIG. 2B.

Please refer FIG. 4A and FIG. 3. FIG. 4A is a schematic diagram illustrating the first operating state of the electronic device 3 and the stand assembly 32 in FIG. 2B. As shown in FIG. 4A and FIG. 3, it is clearly that the main stand member 320 and the auxiliary stand member 322 could be contained in the configuring groove 302 of the casing 30 of the electronic device 3 completely under the first operating state of the electronic device 3 and the stand assembly 32.

Please refer to FIG. 4B. FIG. 4B is a schematic diagram illustrating the second operating state of the electronic device 3 and the stand assembly 32 in FIG. 2B. As shown in FIG. 4B, it is clearly that the first stand 3200 could rotate around the casing 30 when the second stand 3208 of the main stand member 320 slides relatively to the casing 30 of the electronic device 3.

Please refer to FIG. 4B and FIG. 4C. FIG. 4C is a schematic diagram illustrating the third operating state of the electronic device 3 and the stand assembly 32 in FIG. 2B. As shown in FIG. 4C, the first stand 3200 of the main stand member 320 could further include a hollow 3206. The auxiliary stand member 322 could be contained in the hollow 3206 of the first stand 3200. Accordingly, when the first stand 3200 of the main stand member 320 rotates around the casing 30 of electronic device 3, the auxiliary stand member 322 of the stand assembly 32 could be driven by the first stand 3200 to simultaneously rotate around the casing 30 of the electronic device 3.

As shown in FIG. 4C and FIG. 3. The auxiliary stand member 322 is limited by the outline of the configuring groove 302 of the casing 30, so that the auxiliary stand member 322 could rotate around the casing 30 of the electronic device 3.

Figure 5A:
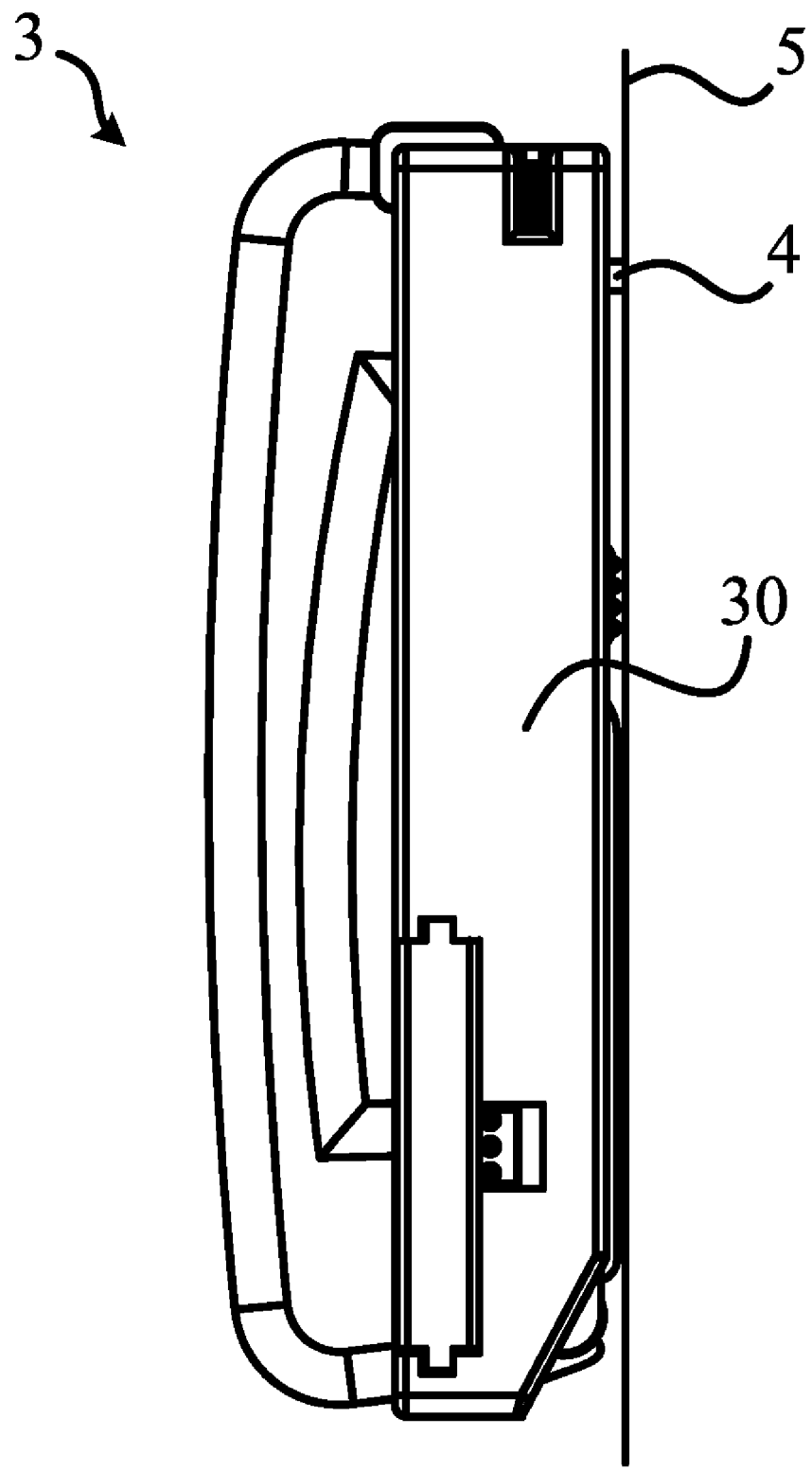
FIG. 5A is a side view illustrating that the electronic device and the stand assembly in FIG. 2B are hitched on the wall under the first operating state.

Please refer to FIG. 5A and FIG. 3. FIG. 5A is a side view illustrating that the electronic device 3 and the stand assembly 32 in FIG. 2B are hitched on the wall 5 under the first operating state. As shown in FIG. 5A, the electronic device 3 could be hitched on the wall 5 by the hanging hole 304 of the casing 30 and the hook 4 and it could be the same level as the line of sight of the user when the electronic device 3 and the stand assembly 32 are under the first operating state (that is to say, the main stand member 320 and the auxiliary stand member 322 of the stand assembly 32 are contained in the configuring groove 302 of the casing 30 of the electronic device 3). At this time, the angle between the electronic device 3 of the invention and the wall 5 could be 0 degree, but it is not a limitation and it should depend on the real situation in practice.

Figure 5B:
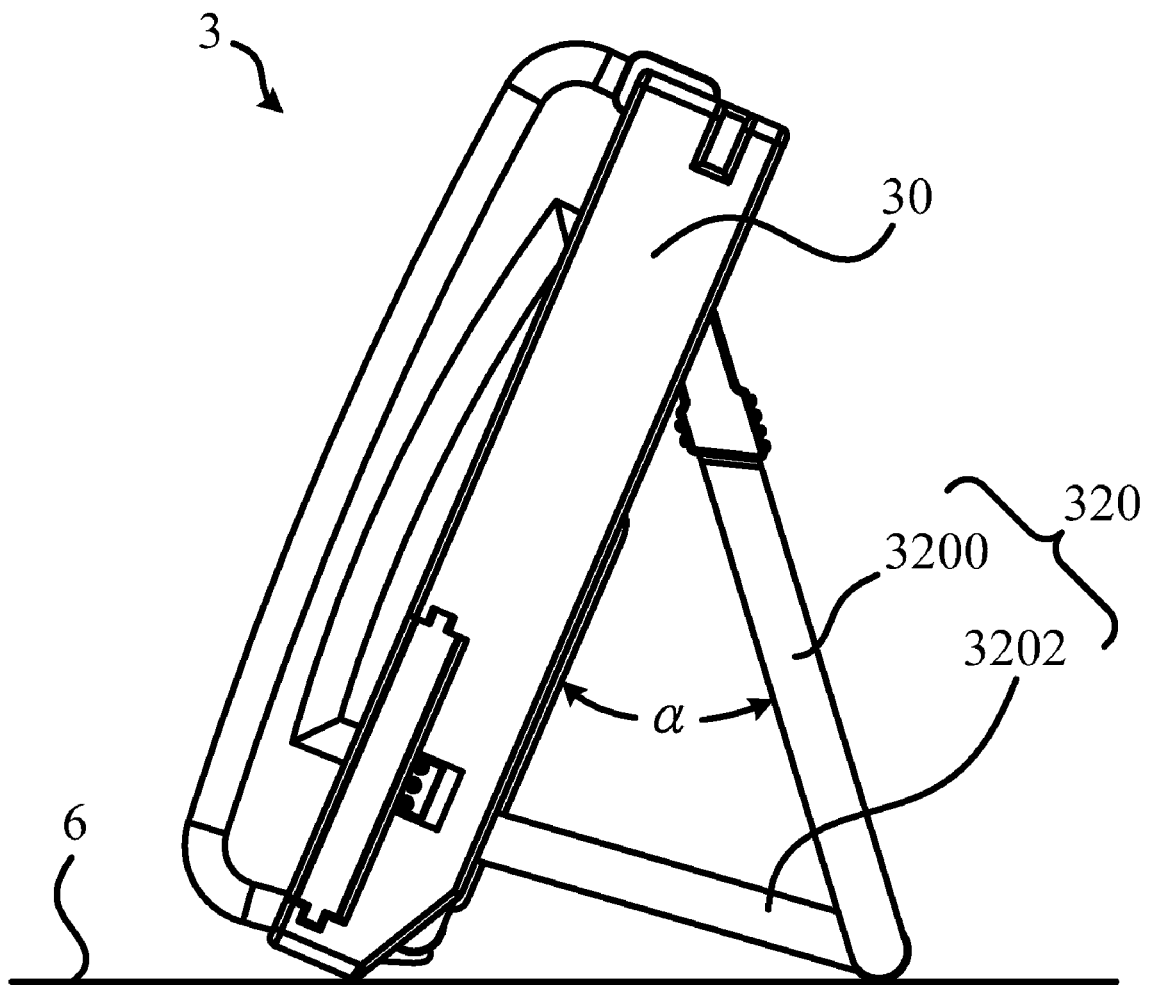
FIG. 5B is a side view illustrating that the electronic device and the stand assembly in FIG. 2B are placed on the tabletop under the second operating state.

Please refer to FIG. 5B. FIG. 5B is a side view illustrating that the electronic device 3 and the stand assembly 32 in FIG. 2B are placed on the tabletop 6 under the second operating state. As shown in FIG. 5B, the electronic device 3 could be placed on the tabletop 6 and the angle between the electronic device 3 and the tabletop 6 could be 65 degree when the electronic device 3 and the stand assembly 32 are under the second operating state (that is to say, the first stand 3200 could be fixed with a first angle α which the first axle 3202 rotates around the casing 30 according to positioning the second stand 3208 of the main stand member 320 on the casing 30 of the electronic device 30). However, it is not a limitation and it should depend on the real situation in practice.

Figure 5C:
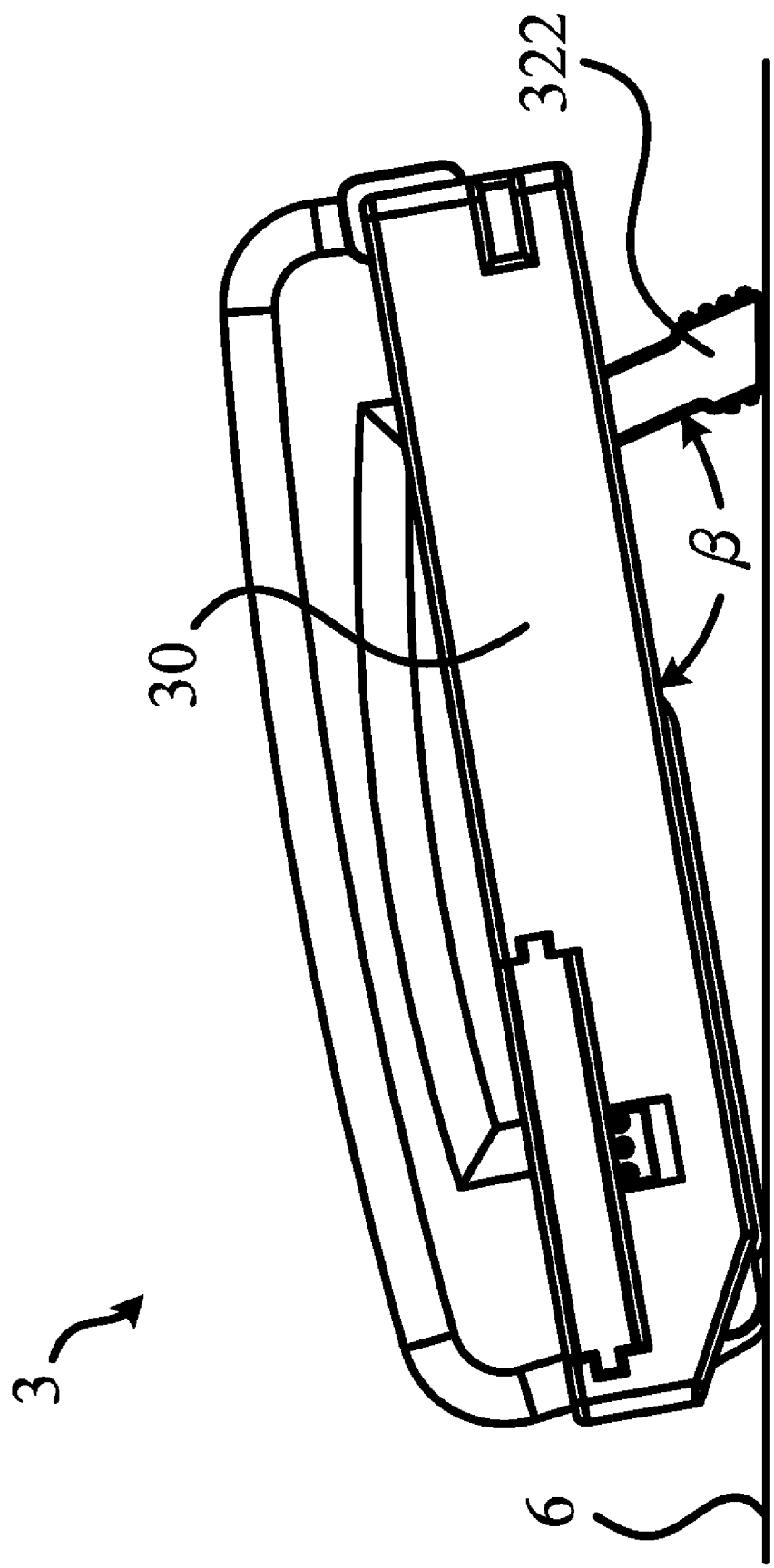
FIG. 5C is a side view illustrating that the electronic device and the stand assembly in FIG. 2B are placed on the tabletop under the third operating state.

Please refer to FIG. 5C. FIG. 5C is a side view illustrating that the electronic device 3 and the stand assembly 32 in FIG. 2B are placed on the tabletop 6 under the third operating state.

As shown in FIG. 5C, the electronic device 3 could be placed on the tabletop 6 and the angle between the electronic device 3 and the tabletop 6 could be 10 degree when the electronic device 3 and the stand assembly 32 are under the third operating state (that is to say, the auxiliary stand member 322 rotates for a second angle β around the casing 30 of the electronic device 3). However, it is not a limitation and it should depend on the real situation in practice.

Besides, please refer to FIG. 3 again. It should be noted that the limiting part 300 of the casing 30 of the electronic device 3 could further include a plurality of positioning structures 3000 for more options of supporting angles for electronic device 3 of the invention. According to the configuration of the plurality of the positioning structures 3000, the wedging part 3210 of the second stand 3208 of the main stand member 320 could selectively wedge with one of the plurality of positioning structures 3000. Accordingly, more supporting angles could be provided as options to the electronic device 3 of the invention.

In one embodiment, the electronic device 3 could be a mobile communicating device, a VOIP phone, or a digital photo frame, but it is not a limitation. In other words, the electronic device 3 of the invention could be other similar kinds of mobile electronic products.

According to the above-mentioned embodiments, the stand assembly and the electronic device of the invention could be unfolded to support the electronic device in various angles according to the user's requirements. The stand assembly and the electronic device of the invention get rid of the traditional stand such as the fixed stand or the combining stand. In addition, the stand assembly and the electronic device of the invention provide merits such as easy use and high elasticity for the user.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A stand assembly for supporting an electronic device, the stand assembly comprising:
a first stand member, comprising:
a first stand, having a first axle and a second axle, the first axle being pivotally connected to the electronic device; and
a second stand, one terminal of the second stand being pivotally connected to the second axle and another terminal of the second stand being connected to various positions of the electronic device selectively, the first stand being fixed with a first angle which the first axle rotates within the electronic device by positioning the second stand on the electronic device; and
an auxiliary stand member, pivotally connected to the first axle for making the auxiliary stand member to rotate within the electronic device for a second angle,
wherein the first stand further comprises a hollow capable of containing the auxiliary stand member, and when the first stand rotates within the electronic device, the auxiliary stand member is driven by the first stand to simultaneously rotate within the electronic device.

2. The stand assembly of claim 1, wherein the second stand comprises a wedging part, disposed in the another terminal of the second stand, for being movably disposed in a limiting part of the electronic device, such that the second stand is capable of sliding relatively to the electronic device.

3. The stand assembly of claim 1, wherein the second stand comprises a wedging part, disposed in the another terminal of the second stand, for selectively wedging with one of a plurality of positioning structures of the electronic device.

4. The stand assembly of claim 1, wherein the second stand comprise a wedging part, disposed in the another terminal of the second stand, for being movably disposed in a groove of the electronic device.

5. The stand assembly of claim 1, wherein the second stand comprises a wedging part, disposed in the another terminal of the second stand, for being movably disposed in a slide rail of the electronic device.

6. The stand assembly of claim 1, wherein the main stand member and the auxiliary stand member is capable of being contained by a configuring groove of the electronic device.

7. The stand assembly of claim 6, wherein the auxiliary stand member is limited by the outline of the configuring groove to rotate within the electronic device for the second angle.

8. An electronic device, comprising:
a casing;
a first stand member, comprising:
a first stand, having a first axle and a second axle, the first axle being pivotally connected to the casing; and
a second stand, one terminal of the second stand being pivotally connected to the second axle and another terminal of the second stand being connected to various positions of the casing selectively, the first stand being fixed with a first angle which the first axle rotates within the casing by positioning the second stand on the casing; and
an auxiliary stand member, pivotally connected to the first axle for making the auxiliary stand member to rotate within the casing for a second angle;
wherein the first stand further comprises a hollow capable of containing the auxiliary stand member, and when the first stand rotates within the casing, the auxiliary stand member is driven by the first stand to simultaneously rotate within the casing.

9. The electronic device of claim 8, wherein the casing further comprises a limiting part, the second stand comprises a wedging part, the second stand is capable of sliding relatively to the casing by the wedging part cooperating with the limiting part.

10. The electronic device of claim 9, wherein the limiting part further comprises a plurality of positioning structures, and the wedging part of the second stand selectively wedges with one of the plurality of positioning structures.

11. The electronic device of claim 9, wherein the limiting part is a groove.

12. The electronic device of claim 9, wherein the limiting part is a slide rail.

13. The electronic device of claim 8, wherein the casing further comprises a configuring groove for containing the main stand member and the auxiliary stand member.

14. The electronic device of claim 13, wherein the auxiliary stand member is limited by the outline of the configuring groove to rotate within the casing for the second angle.

* * * * *